United States Patent [19]

Schmelzer et al.

[11] 3,715,338
[45] Feb. 6, 1973

[54] SEALING COMPOSITIONS FROM POLYKETIMINES ON POLYENAMINES

[75] Inventors: Hans-Georg Schmelzer, New Martinsville, W. Va.; Hermann Gruber, Leverkusen, Germany; Eberthart Degener, Leverkusen, Germany; Kuno Wagner, Leverkusen, Germany

[73] Assignee: Farbenfabriken Bayer Aktiengesselschaft, Leverkusen, Germany

[22] Filed: July 9, 1971

[21] Appl. No.: 161,352

Related U.S. Application Data

[63] Continuation of Ser. No. 772,816, Nov. 1, 1968, abandoned.

[30] Foreign Application Priority Data

Nov. 4, 1967 Germany..................P 17 19 121.8

[52] U.S. Cl.......260/77.5 AM, 156/331, 260/30.6 R, 260/30.8 R, 260/31.8 N, 260/33.8 UB, 260/37 N, 260/77.5 TB, 260/45.95
[51] Int. Cl. ...............................................C08g 22/32
[58] Field of Search................260/77.5 AM, 77.5 TB

[56] References Cited

UNITED STATES PATENTS 3,267,078   8/1966   Damusis......................260/77.5 AM Primary Examiner—Donald E. Czaja
Assistant Examiner—M. J. Welsh
Attorney—Robert A. Gerlach

[57] ABSTRACT

A sealing composition, capable of hardening in the presence of water, is comprised of a polycondensation or polymerization product having a molecular weight of from about 500 to about 10,000 and at least two carbamic acid aryl ester groups and a polyfunctional ketimine or enamine.

7 Claims, No Drawings

SEALING COMPOSITIONS FROM POLYKETIMINES ON POLYENAMINES

This application is a continuation of application Ser. No. 772,816 filed Nov. 1, 1968, now abandoned, and relates to sealing compositions and particularly to sealing compositions based on aryl carbamate containing polymers that can be hardened in the cold without bubble formation.

It is generally preferable to carry out cross-linking of higher molecular weight systems which contain isocyanate groups with diamines or polyamines rather than with hydroxyl containing compounds or water. Such a reaction requires no heat treatment or catalysis and yields urea compounds which are thermally stable and particularly resistant to hydrolysis without carbon dioxide being evolved, as is the case with water, which may lead to the production of cross-linked products which contain bubbles. However, the reaction of the isocyanate groups with primary or secondary amino groups generally proceeds so rapidly that for most purposes the hardening of NCO-containing systems with amines is only possible if the amines used react only slowly, e.g., sterically hindered amines.

The aryl carbamate containing polymerization and polycondensation products to be used according to the invention also react directly with diamines and polyamines, in some cases even with evolution of heat.

At the same time, considerable increase in the velocity of the mixtures occurs making homogeneous distribution of the amines very difficult. These combinations cannot be used industrially either as single component systems or as two component systems. Moreover, the nature and degree of cross-linking obtained in cases where the difficulties due to the rapid increase in viscosity can be overcome, e.g., by the use of solvents, is not totally satisfactory.

A process for the production of polyurethanes sealing compositions which harden in the cold without bubble formation has already been disclosed in French Patent Specification No. 1,461,924. According to this patent specification higher molecular weight compounds which contain terminal isocyanate groups and diketimines are reacted together in the presence of moisture.

It is, however, a disadvantage that only two-component systems can be obtained according to this patent specification. In practice, there is an increasing need in the field of sealing compositions for one-component systems which are much simpler to use. The mixtures of higher molecular weight compounds having terminal isocyanate groups and diketimines which are described in French Patent Specification No. 1,461,924 are, however, not sufficiently stable during storage to be used as one-component systems even with complete exclusion of moisture, and when mixed with isocyanate-containing higher molecular weight compounds, they undergo complete cross-linking even when moisture is most carefully excluded, especially in cases where diketimines of the more strongly basic aliphatic diamines are used.

It is therefore an object of this invention to provide sealing compositions that overcome the disadvantages of the prior art. It is another object to provide sealing compositions from the reaction mixtures that are particularly stable under storage conditions. It is another object to provide one-component sealing systems where moisture is excluded and which harden sufficiently rapidly in moist air at room temperature to form cross-linked compositions which are free from bubbles.

The foregoing objects and others which will become apparent from the following description are accomplished in accordance with the invention, generally speaking, by providing sealing composition, capable of hardening in the presence of water, is comprised of a polycondensation or polymerization product having a molecular weight of from about 500 to about 10,000 and at least two carbamic acid aryl ester groups and a polyfunctional ketimine or enamine.

It is well known that when working with isocyanate-containing higher molecular weight compounds according to the procedure of the above mentioned French patent specification numerous other important precautions must be taken in addition to the exclusion of moisture if the compounds are to be stable during storage, especially in the case of prepolymers which contain urethane groups. One important condition, for example, is the complete exclusion of impurities such as traces of metal salts which catalyze polymerization and cross-linking reactions of the isocyanate group even when present in very low concentrations. The additives such as fillers, pigments, solvents and plasticizers which are used in very many cases therefore have to be both completely free from water and of a high degree of purity. The aryl carbamate group-containing polymerization or polycondensation products to be used according to the invention, on the other hand, are highly insensitive so that, for example additives which only have the usual degree of purity may readily be used. In addition, they are also to a large extent insensitive to moisture. This property is also of particular advantage when the process according to the invention is used to produce two component systems, the advantage being that the arylcarbamate containing products which are to be used according to the invention can be converted into mixtures with the conventional additives such as fillers, pigments and solvents which have the degree of purity and water content usually found in combinations which are not sensitive to moisture, these mixtures being stable in storage and ready for use. The bifunctional or polyfunctional ketimines and/or enamines are then added to these mixtures before they are finally used. A certain water content, due for example to the additives, has the special advantage for these combinations that they very rapidly undergo complete hardening, e.g., even in the interior part and when applied in very thick layers.

Rapid hardening of the sealing compositions obtainable according to the invention even at low temperatures and in thick layers was extremely surprising since it was known from isocyanate chemistry that aryl carbamates (compounds which split off phenols) are hydrophobic systems which are extremely inert, e.g., to water or the usual chain lengthening agents.

The linear and branched polymerization or polycondensation products containing aryl carbamate groups which are to be used in the process according to the invention can be prepared by known methods. They are preferably prepared by reacting suitable polymerization or polycondensation products which contain isocyanate groups with phenol or with phenol derivatives, preferably in stoichiometric proportions and if desired at elevated temperatures, using the usual catalysts such as tertiary amines and/or tin compounds. The isocyanate-containing polymerization or polycondensation products (isocyanate prepolymers) may in turn be prepared by reacting the corresponding polymerization or polycondensation products which contain hydroxyl, amino or sulphydryl groups, preferably the usual hydroxyl-containing polyethers, polythioethers, polyesters, polyacetals or polyester amides, with di- or polyisocyanates, e.g., in an NCO/OH ratio of 0.6 to 1.5 or with a larger isocyanate excess followed by removal of the excess isocyanate, e.g., by thin layer distillation.

Linear and branched polymerization or polycondensation products which contain hydroxyl and sulphydryl groups as well as primary and secondary amino groups are advantageously used. The following polymerization products are given as examples: Polyether polyols which are obtained by anionic polymerization, copolymerization and block copolymerization of alkylene oxides such as ethylene oxide, propylene oxide and butylene oxide with bifunctional or polyfunctional alcohols such as butane-1,4-diol, 1,1,1-trimethylolethane, 1,1,1-trimethylolpropane, hexane-1,2,6-triol, glycerol, pentaerythritol and sorbitol or with amines such as methylamine, ethylene diamine and 1,6-hexamethylene diamine as starting components, or by cationic polymerization and copolymerization of cyclic ethers such as tetrahydrofuran, ethylene oxide and propylene oxide using acid catalysts such as boron trifluoride etherate, polyether polyols which are obtained by polycondensation of glycols which can be polycondensed with removal of water, such as hexane-1,6-diol, in the presence of acid etherification catalysts such as p-toluenesulphonic acid and, for example, with a view to a flame protective action, hydroxyalkylation products of phosphoric acid and phosphonous acids, e.g., with ethylene oxide, propylene oxide, butylene oxide and styrene oxide. The polythioether polyols are advantageously polycondensation products of thiodiglycol with itself and with diols and/or polyols such as hexane -1,6-diol, triethylene glycol, 2,2-dimethyl-propane-1,3-diol and 1,1,1-trimethylolpropane in the presence of acid etherification catalysts such as phosphoric acid and phosphorous acid. The polyacetals are advantageously polycondensation products of formaldehyde and diols and/or polyols such as diethylene glycol, triethylene glycol, butane-1,4-diol, hexane-1,6-diol, thiodiglycol and 1,1,1-trimethylolpropane with acid catalysts such as phosphoric acid and p-toluene sulphonic acid.

The polyesterpolyols are advantageously condensation products of dicarboxylic and/or polycarboxylic acids and dipolyols and/or polyols which are prepared by polycondensation, e.g., of adipic acid, phthalic acid, tetrahydrophthalic acid, hexahydrophthalic acid and endomethylene tetrahydrophthalic acid with ethylene glycol, butane-1,4-diol, diethylene glycol, triethylene glycol, hexane-1,6-diol, 2,2-dimethylol propane-1,3-diol, 1,1,1-trimethylolpropane and hexane-1,2,6-triol. Furthermore, polycarbonates of the above diols and polyols and polyester amides in admixture with amino alcohols such as ethanolamine, and polymerization products of lactones such as ε-caprolactone, may be used.

The above-mentioned polymerization and polycondensation products are converted into so-called isocyanate prepolymers which contain isocyanate groups in known manner using diisocyanates and/or polyisocyanates. If a certain amount of additional chain lengthening via urethane groups can be accepted or is even desirable, the hydroxyl-containing polymerization or polycondensation products are reacted with the diisocyanates or polyisocyanates in an NCO/OH ratio of 0.6 : 1.5, preferably 0.7 - 0.9, if desired first at 0° to 25° C. and with cooling and subsequently, if desired with heating preferably to 50° to 120° C. for several hours. If a chain lengthening reaction is not desired, a substantially larger excess of diisocyanate or polyisocyanate is used, preferably such an amount that an NCO/OH ratio of 3 – 5 : 1 is used the procedure being otherwise the same as for the lower NCO/OH ratios, and the excess diisocyanate or polyisocyanate is subsequently removed, e.g., by thin layer distillation in the case of distillable diisocyanates or polyisocyanates or by extraction with solvents in the case of isocyanates which cannot be distilled.

Any suitable organic diisocyanate or polyisocyanate may be used, such as, for example, toluylene-2,4-diisocyanate and commercial mixtures thereof with toluylene-2,6-diisocyanate; toluylene-2,6-diisocyanate; diphenylmethane-4,4'F-diisocyanate; hexamethylene-1,6-diisocyanate; naphthylene-1,5-diisocyanate; m-xylylene diisocyanate; 1-methyl-2,4-diisocyanatecyclohexane; isophorone diisocyanate; 2,4,4'-trimethyl-1,6-diisocyanato-hexane; dimeric toluylene-2,4-diisocyanate, N,N'-di-(4-methyl-3-isocyanatophenyl)-urea; N,N',N''-tri-(6-isocyanatohexyl)-biuret, triphenylmethane-4,4',4''-triisocyanate, the reaction product of 3 mols of toluylene-2,4-diisocyanate and 1 mol of 1,1,1-trimethylolpropane; trimerization and polymerization products of toluylene-2,4-diisocyanate, mixed trimerization and mixed polymerization products of toluylene-2,4-diisocyanate and hexamethylene-1,6-diisocyanate; mixtures of isomeric diphenylmethane diisocyanates; polyisocyanates which contain more than two benzene rings linked together via methane groups, diisocyanates which have a diphenylmethane structure and the isocyanate groups of which have been partly converted into carbodiimide groups and the like.

The isocyanate-containing polymerization of polycondensation products which have been prepared from the above-mentioned components by known methods are subsequently converted into phenylcarbamates by the known reaction with phenols, preferably in stoichiometric quantities. This reaction is advantageously carried out at elevated temperatures, preferably at 50° to 120° C., and if desired with the use of the catalysts usually employed in isocyanate chemistry such as tertiary amines and/or compounds of divalent and tetravalent tin.

The preparation of the isocyanate-containing polymerization and polycondensation products may be carried out in a melt or in solvents which are inert to isocyanates. When the reaction is completed, any solvents used are removed by distillation, preferably by thin layer distillation although one may advantageously use the solutions of the isocyanate prepolymers directly.

Suitable solvents are, for example, esters such as ethyl acetate, butyl acetate, -methoxy- and β-ethyoxy ethyl acetates; ketones such as ethyl ethyl ketone and methyl isobutylketone; aromatic compounds such as toluene and xylene and mixtures of higher aromatic compounds, as well as mixtures of the said solvents.

The hydroxyl-containing chain lengthening agents conventionally used for reactions in the isocyanate polyaddition process may be used in the preparation of the isocyanate-containing bi- and polyfunctional polymerization or polycondensation products. In addition being chain lengthened, the polymerization and polycondensation products which are in themselves only bifunctional may be branched via urethane groups, e.g., by using polyfunctional chain lengthening agents.

Owing to the increased urethane group content when using chain lengthening agents, the viscosity of the isocyanate prepolymers may be increased to the required extent.

Suitable chain lengthening agents for this purpose include in particular, hydroxyl-containing compounds such as butane-1,4-diol, 1,1,1-tri-methylolpropane and hydroquinone-di-(2-hydroxyethylether).

Suitable catalysts, which may be used in amounts of 0.001 to 2 percent include diazabicyclooctane, dibutyl tin dilaurate and stannous octoate.

Apart from phenol itself, a large number of substituted phenols may be used in the preparation of the aryl carbamates which are to be used in the process of the invention.

Any suitable phenol may be used, such as, for example, o-, m-and p-cresol, cresol mixtures, the isomeric cylenols, 2-sec. -butyl-phenol, 4-tertiary-butyl-phenol, 4-(1,1,3,3-tetramethyl-butyl)-phenol, 4-cyclohexylphenol, 4-nonyphenol mixtures with branched nonyl radicals, dodecyl hexylphenol, 4-nonylphenol mixtures with branched nonyl radicals, dodecylphenol mixtures which can be prepared, e.g., by the addition of suitable olefines to phenols in the presence of Friedel-Crafts catalysts, amyl-, hexyl-heptylphenyl, 4-nitrophenol, 4-chlorophenol, pentachlorophenol, α - and β -naphthol and methyl 4-hydroxy- benzoate, n-butyl-4-hydroxybenzoate, 2-ethylhexyl 4-hydroxy-benzoate and the like.

Phenol or lower alkyl substituted ($C_1 - C_3$) phenols generally evaporate from the products of the process, and this may cause an unpleasant odor as well as a physiological risk and a disadvantageous reduction in bulk. Phenols which are substituted by $C_4 - C_{18}$ is alkyl radicals are therefore preferably used in the preparation of the polymerization or polycondensation products containing aryl carbamate groups which are to be used in the process according to the invention. These starting materials which are preferably used also provide the advantage of a longer pot life which makes the products more reliable when used, e.g., when the two component process is employed.

It might have been thought that not only would the aryl carbamates be suitable to use according to the invention, since they normally decompose into isocyanate and phenols at elevated temperatures, a reaction which is made use of for many purposes, but any so-called isocyanate splitters would behave similarly for the purpose of the invention. It has, however, surprisingly been found that compounds which are analogous in structure to the phenul carbamates used according to the invention and which split off malonic ester, acetoacetic ester or acetylacetone groups and which even decompose at lower temperatures than the compounds which split off phenols, as well as the corresponding compounds which split off tertiary butyl carbamates or groups, cannot be used instead of the phenol splitters or aryl carbamates according to the invention.

Apart from the process described above in detail, which is the preferred process to be used for the preparation of the aryl carbamates used according to the invention, other methods of preparation known per se may, of course, also be used. For example, linear or branched polymerization or polycondensation products which contain primary or secondary amino groups may be reacted with phosgene to form the corresponding carbamic acid chlorides which yield carbamic acid esters in a second stage by reaction with sodium salts of phenols. Chloroformic acid esters of the corresponding phenols may also be used for converting polymerization or polycondensation products which contain amino groups into phenyl carbamates by a single stage process in the presence of hydrogen chloride acceptors.

Suitable bifunctional or polyfunctional ketimines and enamines for use in the present invention are the condensation products which are obtained when aliphatic, cycloaliphatic, araliphatic and aromatic dimensions or polyamines which contain primary and/or secondary amino groups are condensed with aliphatic, cycloaliphatic, araliphatic, aromatic and aliphatic-aromatic ketones, water being split off in the process. These condensation products are advantageously prepared by, for example, continuously removing the water of condensation from the reaction mixture by azeotropic distillation. This condensation reaction generally does not require the use of catalysts. The elimination of water is advantageously carried out by azeotropic distillation, stoichiometric quantities of amines and ketones being reacted together in a suitable solvent such as benzene, toluene or xylene at the boiling point of the solvent.

Suitable diamines or polyamines containing primary and/or secondary amino groups for use in the preparation of the ketimines and enamines are those which contain saturated or unsaturated linear or branched aliphatic hydrocarbon radicals which have two to 36 carbon atoms, cycloaliphatic hydrocarbon radicals which have preferably 6 crbon atoms in the ring, araliphatic hydrocarbon radicals which have benzyl, xylylene, diphenylmethane or tolyl groups and aromatic hydrocarbon radicals which preferably have benzene nuclei, as well as carbonamide groups. The following compounds are given as specific examples; Ethylene diamine, hexamethylene-1,6-diamine, diethylene triamine, 4,4'-diamino-diphenylmethane, toluene-2,4-diamine and toluene-2,6-diamine as well as mixtures of these isomers, xylylene-1,3-diamine, 1-methyl-2,4-diamino-cyclohexane, isophorone diamine, 2,4,4-trimethyl-1,6e-diamino-hexane, 2,5-dimethylpiperazine, N,N'-diisobutyl-hexamethylene diamine, N,N'-dibenzyl-hexamethylenediamine, N,N'-dimethylethylene diamine as well as the usual commercial polyamines which have primary and secondary amino groups and contain carbonamide groups.

Suitable ketones are those which contain two identical or different linear and/or branched aliphatic hydrocarbon radicals having one to 18 carbon atoms, hydrocarbon radicals of this type which form a ring, aromatic hydrocarbon radicals, preferably phenyl radicals, or compounds containing one aromatic hydrocarbon radical, preferably a phenyl radical, and one linear or branched aliphatic hydrocarbon radical having one to 18 carbon atoms. Specific ketones of these types are methyl ethyl ketone, diethyl ketone, methyl isobutyl ketone, diisobutyl ketone, cyclohexanone and acetophenone.

The aryl carbamates to be used in the process according to the invention and the ketimines and/or enamines are mixed in proportions of 0.5 to 2 equivalents of ketimines or enamine per aryl carbamate group the proportion depending on the desired degree of cross-linking. They are preferably used in stoichiometric proportions. The finished mixtures ready for use, if desired together with additives such as fillers, pigments, solvents, plasticizers, thickeners and age-resistors, may be produced by example y the processes and with the apparatuses conventionally used in the lacquer industry. For the one-component system, the components must by anhydrous and the preparation of the mixtures and the filling the mixtures into suitable containers must be carried out with exclusion of moisture. Very stable preliminary mixtures for use in two-component systems into which one only has to introduce the ketimine or enamine component before use, can be prepared especially advantageously from the polymerization or polycondensation products which contain aryl carbamate groups and the additives if used. These additives may be moist and only need to have the commercial degree of purity, no special precautions needing to be observed when preparing these mixtures.

The following are examples of fillers and pigments which may be used in the production of the products of the process; Quartz sand, quartz powder, kaolin, talcum, chalk, asbestos powder, stearates and minerals which have been treated with stearates, titanium dioxide, chromium oxide and iron oxide.

The solvents used are employed in quantities of 25 to 75 percent by weight but preferably below 25 percent by weight, based on the total mixture, and serve particularly to adjust the mixture to the required viscosity. Any of above-mentioned solvents may be used.

Suitable plasticizers which may be included in the preparation of the products are, for example, phthalates such as dimethyl, diethyl and dibutylphthalate, phosphates such as tricresyl phosphate and polyether thioethers such as the condensation product of thiodiglycol and triethylene glycol-mono-n-butyl ether, as well as chlorinated diphenyls.

Suitable age-resistors are, for example, 4-tertiary-butyl-pyrocatechol, 2,6-di-tertiary-butylphenol,2,6-di-tertiary butyl-4-methyl-phenol and ionol.

Catalysts which may be included in the process according to the invention, include tertiary amines such as endoethylene piperazine and organotin compounds such as stannous octoate.

The mixtures of linear and/or branched polymerization or polycondensation products which contain aryl carbamate groups and bifunctional or polyfunctional ketimines and/or enamines and, if desired, fillers, pigments, solvents, plasticizers and age resistors to be used in the process according to the invention are particularly suitable for use as sealing compositions which harden in the cold without bubble formation. They are used, e.g., in construction of buildings and in road building and aircraft construction. The products are applied, depending on their viscosity with the conventional tools, e.g., by brush or trowel.

The rate of hardening is determined by the water content of the mixtures and the moisture content of the surrounding atmosphere and may also be controlled as required by the addition of water.

The products of the process may in particular also be used in the form of stable mixtures as grouting compositions which have properties which make them particularly suitable for use in the building industry, e.g., for grouting concrete to concrete, concrete to glass and concrete to metal joints.

The invention will be further illustrated by the following examples in which parts and percentages are by weight unless otherwise specified.

EXAMPLE 1 a. Preparation of the starting material to be used according to the invention
Preparation of a trifunctional polyether having terminal 4-nonylphenyl-carbamate groups About 1000 parts of a trifunctional polypropylene glycol of OH number 56, prepared according to known processes by the anionic polymerization of propylene oxide with 1,1,1-trimethylolpropane or its sodium alcoholate, and about 150 parts of toluylene-2,4-diisocyanate, are mixed at about 20° to about 25° C. The mixture is heated at about 70° C. for about 5 hours with stirring, after which it has an NCO content of 3 percent. About 5 parts of dibutyl tin dilaurate and about 190 parts of a commercial 4-nonylphenol mixture having branched nonyl radicals are added to the isocyanate prepolymer which has been cooled to about 20 to about 25° C. The mixture is then heated at about 70° C. for a further 4 hours with stirring. The product then contains practically no free isocyanate groups and has an equivalent weight of about 1630.

Preparation of 1,6-di-(cyclohexylidene-imino)-hexane

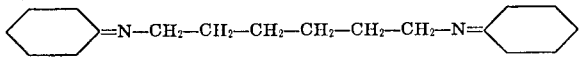

About 196 parts (2 mols) of cyclohexanone and about 116 parts (1 mol) of hexamethylenediamine are heated under reflux in about 500 parts by volume of toluene, the water formed on condensation being continuously removed from the reaction mixture by means of a suitable apparatus. The major portion of water has been eliminated after about 6 hours. Condensation is continued for a further 6 hours under reflux to effect complete removal of the remaining water. The toluene is then distilled off, first under normal pressure and later in vacuo. 1,6-di-(cyclohexylidene imino)-hexane which is sufficiently pure for use according to the invention remains behind in practically quantitative yield.

b) Process according to the invention

Preparation of an elastic sealing composition

About 100 parts of the polyether prepared according to a), which polyether contains 4-nonylphenyl-carbamate groups, are mixed with about five parts of xylene, about 10 parts of titanium dioxide rutile, about 20 parts of calcium carbonate, about 30 parts of alumina and about 10 parts of hydrogenated castor oil which acts as thickener. The fillers and pigments are homogeneously distributed by means of a planetary mixer provided with a vacuum device so the mixture can at the same time be freed from included air at a pressure of 0.5 mm Hg. The resulting mixture is stable during storage in spite of the use of additives which have the usual moisture content and are only of a commercial degree of purity. About 8 parts of 1,6-di-(cyclohexylidene-imino)-hexane prepared according to a) are added to yield a hardenable mixture. A paste which can be worked up for 24 hours is obtained. Test samples are prepared according to DIN 53455 (Buchmann rod 100X10X 4 mm) to test the technological properties. Hardening proceeds under the action of the atmospheric moisture. Cross-linking is completed after 7 days at standard atmospheric conditions (20° C./65 percent relative humidity). The test yields the following results:

| | |
|---|---|
| Shore hardness (DIN 53505) | 32 |
| Elongation at break | 680 percent |
| Tensile strength | 12.5 kg wt/cm$^2$ |
| Tension at 100 percent elongation | 5.5 kg wt/cm$^2$ |
| Tear propagation resistance (DIN 53515) | 7.4 kg wt/cm |

EXAMPLE 2 a. Preparation of the starting material

Preparation of a trifunctional polyether having terminal phenyl carbamate groups The same procedure is employed as in Example 1a) but the isocyanate prepolymer obtained from the trifunctional polyether and toluylene-2,4-diisocyanate is reacted with about 81 parts of phenol in the presence of about 5 parts of dibutyl tin dilaurate instead of with about 190 parts of the commercial 4-nonylphenol mixture for about 4 hours at about 70° C. The reaction product has an equivalent weight of about 1,500 and contains practically no free isocyanate groups.

b. Process according to the invention

Preparation of an elastic sealing composition

A mixture which is stable during storage is obtained from about 100 parts of the polyether with terminal phenylcarbamate groups prepared according to a) and the additives mentioned in Example 1b) which have the usual moisture content and commercial degree of purity, by employing the procedure described in Example 1b). After the addition of about 8 parts of the diketimine prepared according to Example 1a), the paste which now hardens in moist air is suitable for use within about ½ hour. When applied in a thick layer, e.g., in a 1 cm thick concrete to concrete joint, the composition is completely hardened after 3 to 7 days, depending on the atmospheric moisture. The tests on test rods prepared according to DIN 53455 yield the following results:

| | |
|---|---|
| Sore hardness (DIN 53505) | 36 |
| Elongation at break | 620 percent |
| Tensile strength | 18 kg wt/cm$^2$ |
| Tension at 100 percent elongation | 6.5 kg wt/cm$^2$ |
| Tear propagation resistance (DIN 53515) | 5.8 kg wt/cm |

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is

1. A sealing composition capable of hardening in the presence of moisture which comprises a mixture of (1) a prepolymer having a molecular weight of from about 500 to about 10,000 and containing at least two terminal carbamic acid aryl ester groups which groups are substituted with alkyl groups of from four to 18 carbon atoms and (2) a polyketimine or a polyenamine.

2. The sealing compositions of claim 1 wherein the ketimines or enamines are present in the mixture in an amount of about 0.5 to 2 equivalents per carbamic acid aryl ester group.

3. The sealing compositions of claim 1 wherein the compound (2) is a ketimine.

4. The sealing compositions of claim 1 wherein the compound (2) is an enamine.

5. The sealing compositions of claim wherein the composition (1) is the reaction product of an organic compound having at least two active hydrogen atoms which are reactive with —NCO groups, an organic polyisocyanate and a phenol substituted by $C_4$ to $C_{18}$ alkyl groups.

6. The sealing composition of claim 1 wherein the polyketimine is 1,6-di-(cyclohexylidene-imino)-hexane.

7. The sealing composition of claim 1 wherein the polyketimine is N,N-di-(2-cyclohexylideneiminoethyl)-cyclohexenyl-(1)-amine.

* * * * *